Patented June 13, 1950

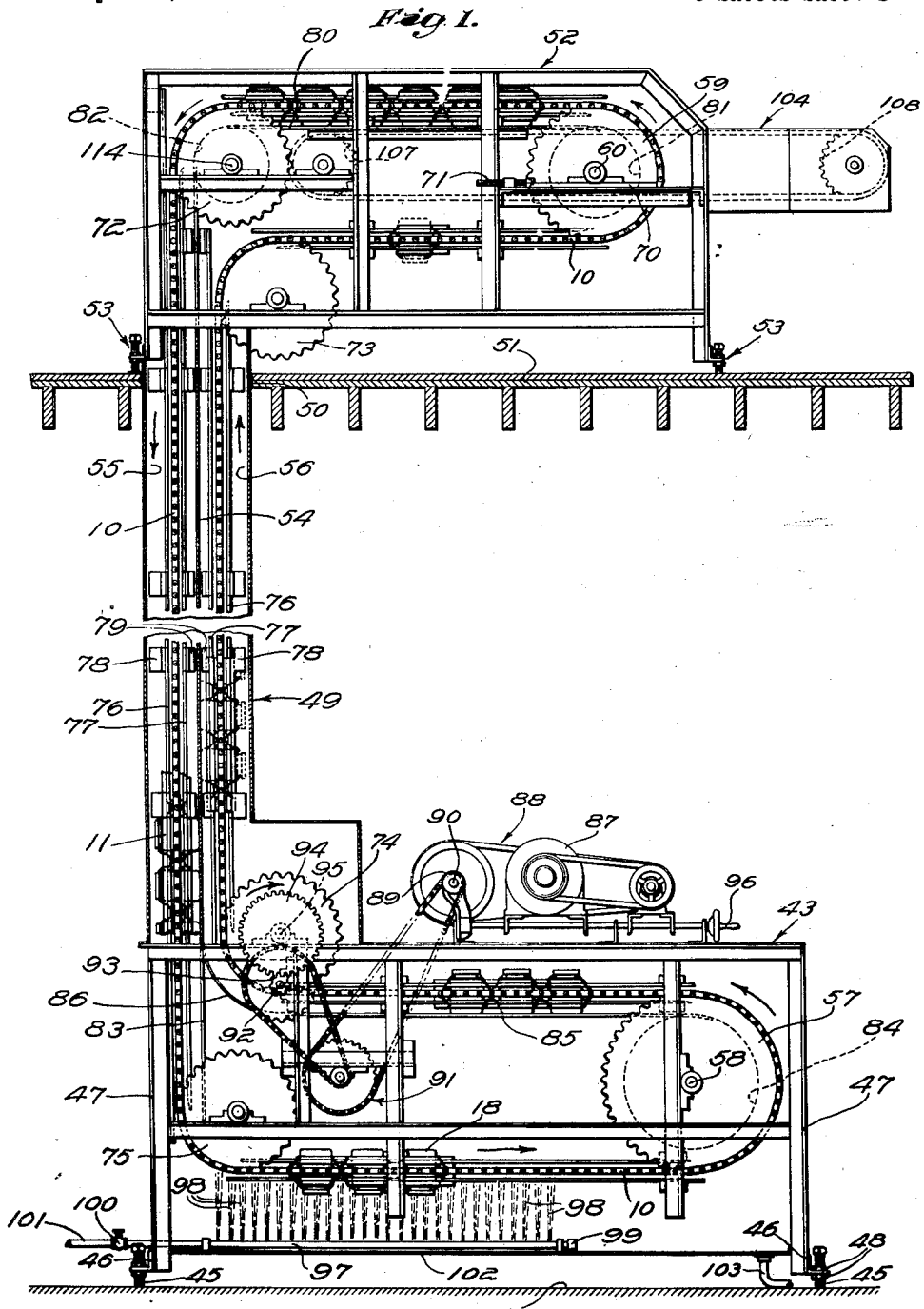

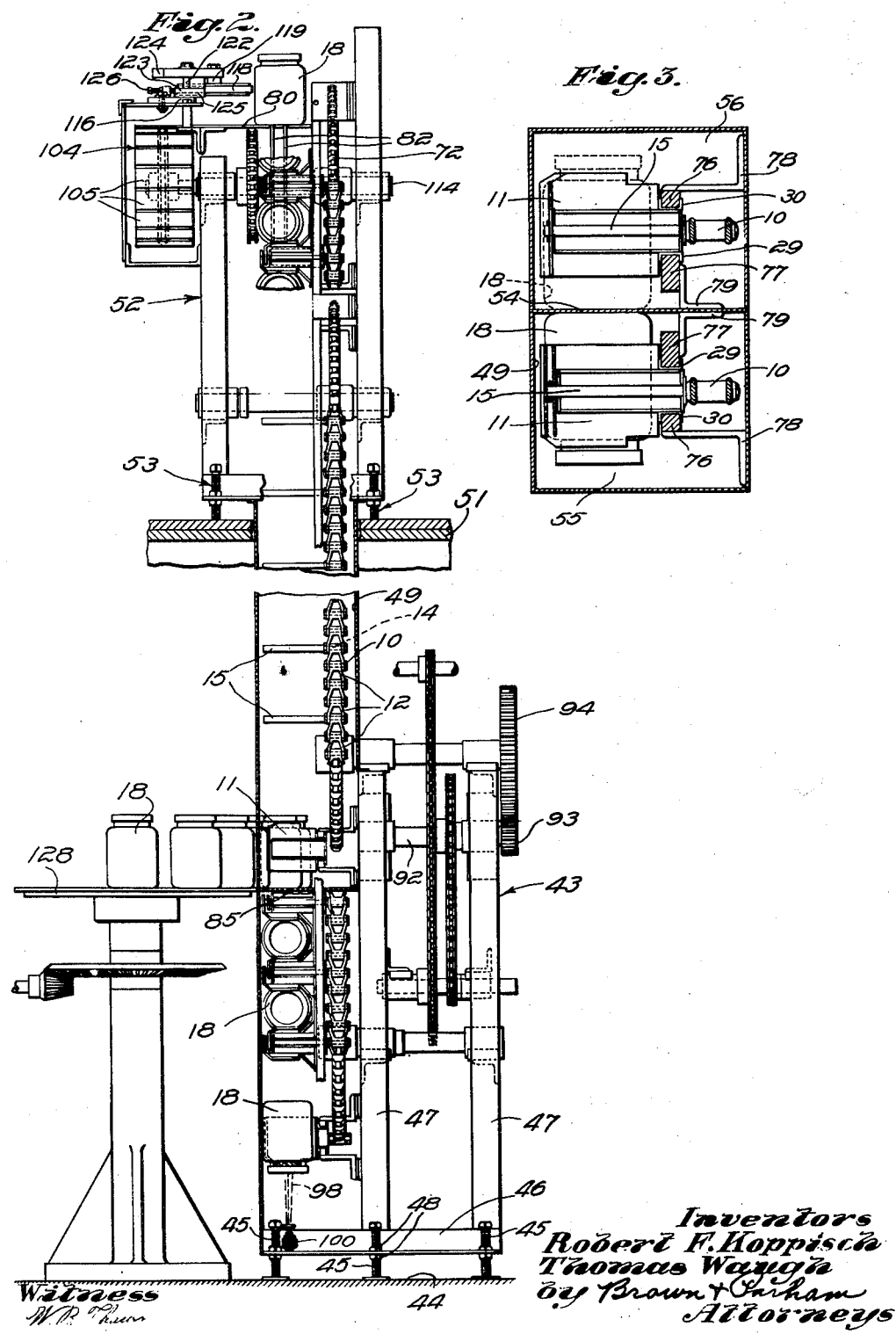

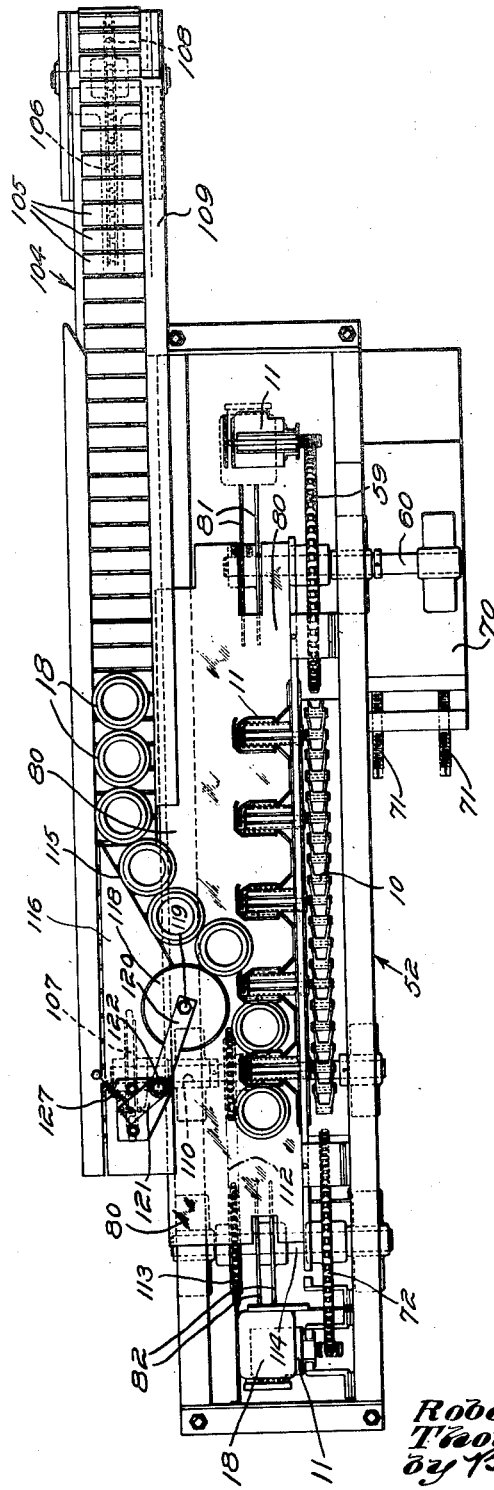

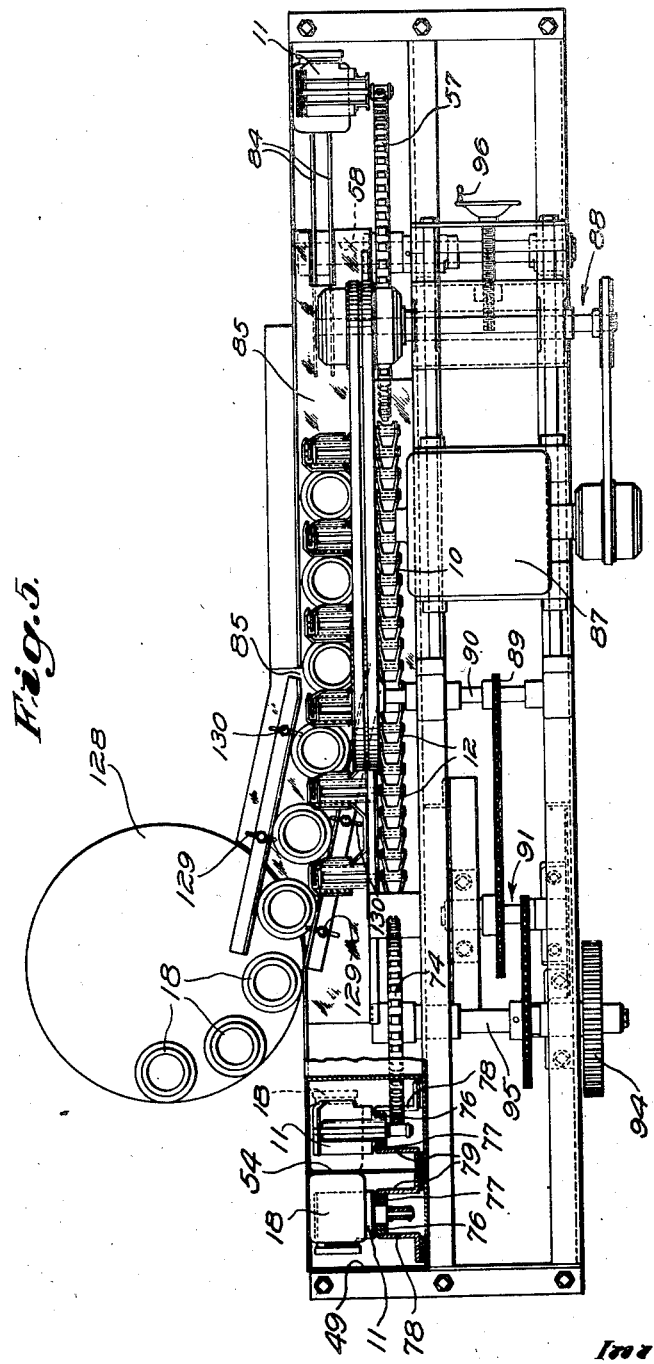

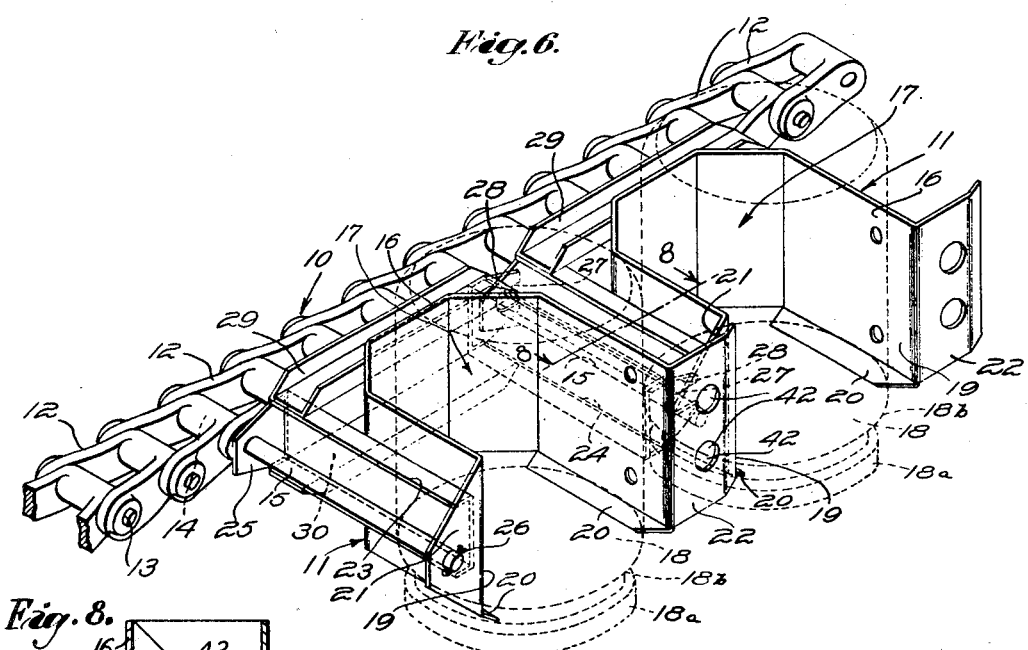
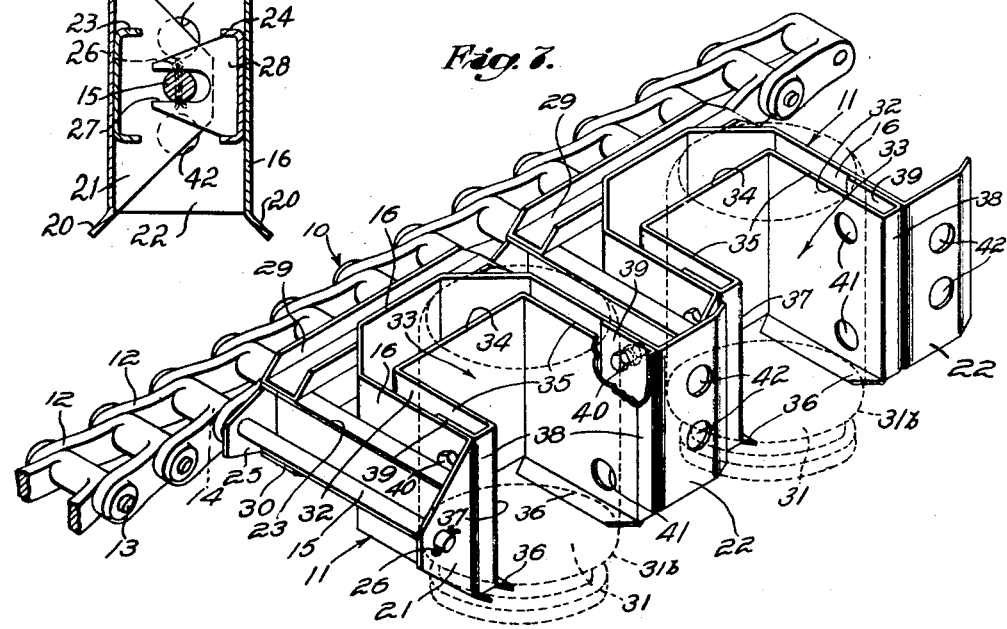

2,511,534

UNITED STATES PATENT OFFICE 2,511,534

APPARATUS FOR CONVEYING CONTAINERS

Robert F. Koppisch, Hartford, and Thomas Waugh, West Hartford, Conn., assignors to Hartford-Empire Company, Hartford, Conn., a corporation of Delaware Application September 16, 1943, Serial No. 502,630

8 Claims. (Cl. 198—22)

This invention relates to improvements in apparatus for conveying and washing containers, especially, although not necessarily, those made of glass, prior to the filling of such containers with a suitable food product or other packageable commodity.

It is usual in commercial plants in which glass containers, such as jars, are filled with food products or other substances, to provide a separate storage room or space for the containers which subsequently are to be packed. The containers may be stored here in the cartons in which they were supplied to the packer. This container storage room or space may be located at a different level from that at which at least the initial operation involved in filling the containers is to be effected, as above the filling room.

It is desirable to wash or otherwise cleanse the containers, particularly throughout their internal surfaces, before filling them with a food product. Otherwise, they may not be entirely free from lint from the cartons, dust, small pieces of glass or other foreign matter.

An object of the invention is to provide a rapid, safe, economical and efficient apparatus for automatically taking glass containers, such as jars, at a loading station which may be located above a container filling room, and for transporting the containers in a series, each in an individual holder, to a place in the underneath or lower level filling room where they may be cleansed by an associate container-cleansing mechanism and thence to a container unloading or delivery station in the filling room.

A further object of the invention is to provide an apparatus of the character described which will be effective to present each of a series of glass containers in turn to position to be acted upon at one level by upwardly directed jets of cleaning fluid and thereafter to be delivered at a higher level to an associate filling machine.

A further object of the invention is the provision in an apparatus of the character described of an endless traveling conveyor and a series of separate container holders carried thereby and constructed and arranged to cooperate effectively with automatic container loading means at the loading station and with automatic container unloading means at the delivery station and with a container washing means by which each container transported by the conveyor will be thoroughly washed and rinsed before it arrives at the unloading station.

A further object of the invention is the provision in an apparatus of the character described of a novel conveyor-carried holder or receptacle for a glass container, such as a jar, such holder or receptacle having an opening at one side through which the glass container may be moved laterally into and out of the holder or receptacle and being adapted to support the glass container therein in such a way as to offer no obstruction to the passage of cleaning fluid into and out of the container when the latter is disposed in an inverted position.

Other objects and advantages of the invention will hereinafter be pointed out or will become apparent from the following description of a practical embodiment of the invention, as shown in the accompanying drawings, in which:

Figure 1 is a view, mainly in side elevation and partly in vertical section, of glass container conveying and washing apparatus of the invention;

Fig. 2 is a view, mainly in end elevation and partly in vertical section, of the same apparatus;

Fig. 3 is a relatively enlarged horizontal section through a vertical hollow casing which is included in the supporting structure of the apparatus and through the vertical runs of the conveyor therein;

Fig. 4 is a top plan view of the apparatus, showing the mechanism for loading containers into the container holders or receptacles on the conveyor of the apparatus;

Fig. 5 is a view showing in plan the supporting structure and operating parts of the lower portion of the apparatus, including a mechanism for unloading containers from the individual holders or receptacles and for feeding these conveyors to an associate filling machine, the latter being shown diagrammatically;

Fig. 6 is a relatively enlarged fragmentary perspective view of a portion of the conveyor and two adjacent container holders or receptacles thereon;

Fig. 7 is a view similar to Fig. 6 but showing the container holders or receptacles provided with size-reducing adapters; and Fig. 8 is a relatively enlarged fragmentary vertical section along the line 8—8 of Fig. 6.

The main conveyor or carrier

Apparatus embodying the invention may comprise an endless main conveyor or carrier comprising an endless chain 10 and container holders or receptacles 11 carried by the chain. As best seen in Figs. 6 and 7, the conveyor chain 10 may be formed of a series of links 12. Adjacent links are pivotally connected by pivot pins 13 or 14. The pivot pins 13 are conventional but the pivot pins 14 are special in that each has an end portion or extension 15 extending laterally of the conveyor chain for a substantial distance for use as an attaching element for connecting a container holder or receptacle to the chain. The pivot pins 14 are provided in lieu of the ordinary pivot pins 13 at regularly spaced intervals along the length of the endless conveyor chain.

As shown best in Fig. 6, each container holder or receptacle 11 may comprise a sheet metal member 16 bent to a generally U-shaped configuration in cross-section so as to form a pocket 17 which is open at its top, bottom and one side. The latter may be termed its front. The pocket 17 is of sufficient size to accommodate the glass container 18 that is to be carried by the holder. The opening, indicated at 19 in Fig. 6, at the front of the pocket 17 is of sufficient width to permit the glass container 18 to be moved laterally therethrough into and out of the pocket. It may extend the full width of such pocket, as shown in Fig. 6.

The glass container 18 is shown as being a jar having an open end or neck finish portion, indicated at 18a, of less diameter than the body of the jar. The jar thus has a shoulder indicated at 18b, at the juncture of its larger body portion with its smaller open end or neck finish portion.

The sheet metal member 16 also may be formed to provide downwardly and inwardly extending container supporting flanges 20 at the bottom end of the pocket. These are adapted to extend underneath the shoulder 18b of the glass container so as to support the container in inverted position in the pocket. The open end portion of the container thus will be completely unobstructed when the container is in inverted position as shown in Fig. 6. This is for a purpose which presently will be pointed out.

The sheet metal member 16 also may include laterally bent oppositely extending flanges 21 and 22, respectively, at the front of the holder pocket. See also Fig. 8. Horizontal channel members 23 and 24, respectively, may be provided at the sides of the holder pocket, being fastened to the metal member 16 by welding or in any other suitable known way. The channel member 23 is provided at its rearward end with an outturned portion or flange 25 which is parallel with the flange 21. Aligned openings are provided in the parallel flanges 25 and 21 to accommodate the projecting end portion 15 of one of the long pivot pins 14. A cotter pin 26 may be provided in the protruding extreme outer end portion of the part 15 of the pivot pin 14 to prevent accidental displacement of the container holder therefrom. The laterally extending portion 15 of an adjacent pivot pin 14 extends through open slots or notches 27 in laterally turned ears or flanges 28 on the ends of the channel member 24. Each holder thus is supported at both its sides on projecting end portions 15 of adjacent pivot pins 14 of the conveyor chain. The laterally turned flange 22 of each holder may overlap the flange 21 of the adjacent holder so that the projecting end portion 15 of each pivot pin 14 serves as a supporting element for the adjacent side portions of adjacent holders and connects them pivotally together to form an articulated series of holders connected with and carried by the conveyor chain.

Each holder 11 may be provided with upper and lower transversely extending guiding members 29 and 30 respectively. These may extend between the back wall of the holder pocket and the conveyor chain, being fastened by welding or in any other suitable known way to the rearward end portions of the side channel members 23 and 24. As shown, the transversely extending guide members 29 and 30 are channels which respectively have their flanges turned upward and downward. The function of these guide members will presently be pointed out.

To adapt container holders substantially like that described for use to carry glass containers 31 of less diameter than the glass container 18, the size of the pocket of each such holder may be reduced by placing an adapter 32 in that pocket, as shown in Fig. 7. The adapter 32 may be a sheet metal member bent to form an inner pocket 33 having a rear wall 34 and a pair of side walls 35, the latter being formed with inwardly and downwardly inclined flanges 36 for extending underneath the shoulder 31b of the glass container 31 so as to support the latter when it is inverted. The pocket 33 is open at its front, as at 37, to permit lateral movement of the glass container 31 into and out of the pocket. The adapter 32 may include attaching members comprising portions of the pocket-forming metal sheet bent laterally outward at 38 and then rearwardly at 39 flat-wise against the side portions of the main holder member 16, to which they may be fastened by fastening devices 40. Appropriate openings, such as that indicated at 41, may be provided in the adapter side walls 34 for the accommodation of tools used to adjust the fastening devices 40 to install or remove the adapter. Other openings, such as those indicated at 42 in the flange 22 of the main pocket member 16 may be provided to permit access to the cotter pins 26 in the outer end portions of the pivot pins by which the holders are supported on the conveyor chain.

*The conveyor supporting and guiding structure*

The apparatus shown in the drawings is designed and intended to take containers at a loading station in a room or space on an upper floor and to carry the containers in a series downwardly to present them to a washing mechanism on a lower floor and thereafter to move the containers to an unloading station at which they may be delivered to a filling machine. The supporting and guiding structure then returns the idle run of the conveyor to the upper floor and again past the loading station so that the container-transporting operation of the apparatus may be continuous. If desired, the containers may be left in the holders on the conveyor as such holders are moved past the unloading station and thus returned to the upper floor, whence they may be removed manually. This operation may be advantageous in the event that the filling machine should be shut down, as over-night, while there are still containers in the holders or receptacles of the conveyor as it may be desirable to again wash such containers on resumption of operations before feeding them to the filling machine.

The particular supporting and guiding structure of the apparatus shown in the drawings comprises a lower open framework 43, adjustably supported on a lower floor 44, as by screws 45, Figs. 1 and 2. These screws may pass through suitable openings (not shown) in the outturned flanges of angle brackets 46 which extend transversely across the lower end portions of vertical members 47 of the framework 43, as best seen in Fig. 2. Nuts 48 are provided on the screws above and below the outturned flanges of the angle brackets so that the framework structure 43 may be supported firmly on the floor 44 and made level, irrespective of slight inequalities of level in the floor surface.

The framework structure 43 carries a vertically disposed hollow casing 49 which may be made of sheet metal and be of sufficient length to extend upwardly through a suitable opening 50 in an upper floor 51. The casing 49 rests upon what may be termed the inner end portion of the framework structure 43.

An upper framework structure 52 may be provided on the upper floor 51 on which it may be supported adjustably by adjustable supporting devices 53 similar to those described for the lower framework. The devices 53 may be adjusted to maintain the framework structure 52 firmly supported and level. The upper framework structure 52 may be disposed vertically above the lower framework structure 43 and the upper end of the casing 49 may be connected, as by welding, with the lower part of what may be termed the inner end portion of the upper framework structure.

A vertical partition 54 may be provided in the casing 49 so as to divide the latter internally into two similar open-ended vertical shafts 55 and 56, respectively.

A sprocket 57, which may be termed a lower terminal sprocket, may be operatively supported within the outer end portion of the lower framework structure 43, as by being carried by a transversely extending shaft 58 which is journaled in suitable bearings on the framework structure 43. An upper terminal sprocket 59 is rotatably supported to turn about a transversely extending axis in the outer end portion of the upper framework structure 52. One of these sprockets may be supported for adjustment relative to its supporting framework structure so as to maintain the conveyor chain 10 suitably taut when the chain is trained about these sprockets and is suitably guided at intermediate places, as presently will appear. As shown, the upper terminal sprocket 59 is adjustable, being mounted on a transversely extending shaft 60 which is journaled in bearings on a slide block 70 which may be adjusted fore-and-aft of the upper supporting framework structure within limits by the adjusting screws 71, Figs. 1 and 4.

The upper framework structure 52 also supports at its inner end portion an upper rotatable guiding sprocket 72 and a lower rotatable guiding sprocket 73. The inner end portion of the lower framework structure 43 rotatably supports an upper rotatable guiding sprocket 74 and a lower rotatable guiding sprocket 75. When the endless conveyor chain is trained about these sprockets, as best seen in Fig. 1, it will be supported for movement so as to carry the container holders or receptacles 11 along vertical runs passing through the vertical shafts of the casing 49 and along horizontal runs in each of the upper and lower framework structures.

The container holders or receptacles 11 are stayed against vibration and jiggling during their vertical movements by the conveyor chain in the vertical shafts 55 and 56 by the sliding contact of spaced vertical rails 76 and 77, respectively, in each of these shafts with the transversely extending guide channels 29 and 30, respectively, on the holders or receptacles. The vertical rails 76 and 77 may be secured in place in the vertical shafts in any suitable manner, as by the attaching brackets 78 and 79, Figs. 1, 3 and 5.

The glass containers are prevented from dropping endwise out of the container holders or receptacles during the periods of travel of these holders or receptacles when they are inverted or have been tilted below the horizontal. To this end, a horizontal plate 80 may be mounted in the upper part of the upper frame structure 52 between the upper portions of the sprockets 59 and 72. The upright glass containers in the inverted holders or receptacles 11 above this plate may slide at their bottoms on the plate during the upper horizontal run of the conveyor in the framework structure 52. Disks 81 best seen in Fig. 4, may be provided on the sprocket supporting shaft 60 for retaining the glass containers in their respective holders or receptacles during the movements of such holders or receptacles around the sprocket 59. Similar retaining disks 82 may be provided on the shaft on which the sprocket 72 is supported. During the vertical runs of the conveyor in the shafts 55 and 56, the glass containers will be retained against endwise displacement from their holders or receptacles by the sliding contact of the bottoms of the containers with the vertical partition wall 54, as clearly shown in Figs. 1 and 3. The partition 54 may have a downward extension, indicated at 83, Fig. 1, for retaining the containers in vertically moving holders or receptacles below the shaft 55. It of course will be understood that the glass containers 18 will be retained in their holders or receptacles 11 by the supporting flanges 20 at the tops of these receptacles when the glass containers are inverted, as shown for certain of the glass containers on the lower horizontal run on the conveyor in the lower portion of Fig. 1. Disks 84, Figs. 1 and 5, may be mounted on the shaft 58 to retain the glass containers in their holders or receptacles during movement of the latter around the terminal sprocket 57. A horizontal plate 85 is mounted in the upper part of the lower framework structure 43 for supporting and slideably contacting with the bottoms of the containers in the receptacles passing from the sprocket 57 to the guide sprocket 74. An arcuately curved stationary guide plate 86 may be provided in the inner end portion of the lower framework structure 43 in concentric relation with the sprocket 74 to contact with the bottoms of the glass containers in the holders or receptacles passing around the sprocket 74 upwardly to the vertical shaft 56. The containers may have been unloaded from the holders or receptacles prior to this time so that the guiding and retaining member 86 will function only when glass containers are being returned to the upper floor. The holders or receptacles 11 in which glass containers are shown in dot-and-dash lines, in Figs. 1, 3, 4 and 5, would have been vacated unless these containers were being returned to the upper floor, assuming movement of the conveyor in the direction indicated by the arrows in Fig. 1.

The conveyor driving mechanism

Any suitable mechanism may be provided for driving the conveyor at the speed and in the manner desired. As shown in Figs. 1 and 5, a motor 87 is provided on the lower framework structure and is operatively connected by a suitable adjustable speed change train of motion transmitting devices generally indicated at 88 with a relatively small sprocket 89, Fig. 1, on an intermediate transversely extending driven shaft 90. The sprocket 89 is part of a train of sprockets and chains generally indicated at 91, Figs. 1 and 5, by which a final drive shaft 92 is rotated. The shaft 92, Fig. 1, carries a relatively small spur gear 93 in mesh with a larger gear 94 on a shaft 95 which is the shaft on which the conveyor guiding sprocket 74 is mounted. The sprocket 74 thus serves as the driving sprocket for the conveyor. The sprocket 74 may be turned by the driving mechanism described to drive the chain in the direction shown by the arrows in Fig. 1. The conveyor thus has a descending run in the vertical shaft 55 and an ascending run in the shaft 56.

The speed change mechanism 88 may be of any suitable known type and may be adjustable, as by manipulation of a hand wheel 96, Figs. 1 and 5.

The container washing mechanism

The washing mechanism employed may comprise a suitable liquid discharge pipe 97 having jet holes for effecting discharge of a series of upwardly directed jets 98, Fig. 1, of liquid under pressure. These jets will enter the inverted glass containers 18 during the movement of these containers along the lower horizontal run of the conveyor in the lower part of the lower frame structure 43. The jets may be of water, which may be suitably heated, or any other suitable cleansing fluid may be employed. As shown, the pipe 97 extends horizontally beneath the lower run of the series of inverted glass containers in the lower portion of the apparatus and is closed at its free end, as at 99, and connected at its other end through a valve 100 with a liquid supply pipe 101. A liquid catch plate 102 may be provided beneath the discharge pipe 97 and may be provided with a drain pipe 103 for conducting the waste liquid to any suitable place. It will be understood that the jets 98 are discharged with sufficient velocity to effect thorough cleansing of the entire inner surfaces of the inverted glass containers during the passage of the latter across these jets. The outer surfaces of these containers also will be subjected more or less to the cleansing action of the jets of liquid, particularly at the portions surrounding the filler openings of the containers.

After passing beyond the jets of cleansing fluid, the glass containers will be maintained in inverted position for a sufficient part of their travel to assure draining of the wash water therefrom, preferably onto the liquid collecting and drainage plate 102. Thereafter, the containers will be conducted upwardly around the terminal sprocket 57 and reverted to an upright position as they are moved along the upper horizontal run of the conveyor in the lower frame structure 43.

The loading mechanism

As previously pointed out, the containers to be used may have been stored on or above the upper floor 51. These containers may be removed from their cartons (not shown) and placed on the upper horizontal run of a loading conveyor generally indicated at 104 in Figs. 1, 2 and 4. As best seen in Fig. 4, the loading conveyor 104 may comprise a series of slats or plates 105 on a chain 106 which is trained about the horizontally spaced sprocket wheels 107 and 108. The sprocket 108 is rotatably supported in an outer end extension 109 of the upper framework structure 52. The sprocket 107 is mounted on a transversely extending shaft 110 which is journaled in suitable bearings in the inner end portion of the upper framework structure 52. This shaft 110 carries a sprocket 111, Fig. 4, connected by a chain 112 with a sprocket 113 on a shaft 114 which is the same shaft that carries the rotatable sprocket 72 for the conveyor chain 10. The loading conveyor 104 thus is driven from the main conveyor in synchronized speed relation with the latter and in the direction indicated by the arrow in Fig. 4.

When each of the upright glass containers 18 on the loading conveyor 104 has been moved by the latter to the loading station hereinbefore referred to, such container is guided by a diagonally extending edge 115 of a deflector plate 116, Fig. 4, from the loading conveyor onto the plate 80 and against the periphery of a freely rotatable container loading wheel 118. The wheel 118 is suspended by a vertical pin 119 from the outer end portion of a horizontal arm 120 of a bell crank lever 121. The bell crank lever is journaled to turn about a vertical axis, being mounted on a short vertical shaft 122, Fig. 2, carried by a supporting plate 123. The latter may be fastened upon a portion of the plate 116. The bell crank lever 121 has a shorter arm 124 provided with a downwardly extending abutment or lug 125, Fig. 2, which is held against an adjustable stop screw 126 by the action of a tension coil spring 127, Fig. 4.

Each glass container 18, on striking the periphery of the loading wheel 118, will tend to move onward under pressure from the oncoming containers so as to be pressed by the wheel into the pocket of the next vacant holder or receptacle that is carried by the main conveyor past the periphery of the wheel 118. The operation is substantially as indicated for the series of containers 18 shown in Fig. 4. Should the pocket of a holder or receptacle be occupied at the time of attempted passage of another container into it, the spring 127 will yield so that the wheel 118 will swing away from the main conveyor and the container that has failed to enter the filled pocket will not be broken but its further movement will be held up until the next empty pocket arrives at the loading station. The action is automatic and will effect rapid and safe loading of glass containers into the pockets of the successive holders or receptacles arriving at the loading station.

The unloading mechanism

Referring now to Fig. 5, a filling machine is represented by the circle designated 128, it being understood that this filling machine may be rotary or include a rotary part onto which the containers are to be transferred. To effect unloading of the containers from their holders and their transfer to the filling machine 128, a pair of spaced switch rails 129 may be arranged on a portion of the supporting plate 85 which hereinbefore has been referred to as serving to prevent the containers from dropping endwise from their holders or receptacles during the upper horizontal run of the conveyor in the lower framework structure 43. These switch rails form a runway which will divert the glass containers from their holders and guide them along a diagonal path across the supporting plate onto the rotary filling machine 128.

Should it be desired to return the containers to the storage room without unloading them from the conveyor, as indicated by the showing by dot-and-dash lines of containers on the ascending flight of the conveyor, the switch rails 129 may be removed or adjusted to accomplish this result. In practice, the switch rails may be suitably mounted so that they may be rendered inactive when desired without removing them from the supporting plate. In the construction shown in Fig. 5, the switch rails are fastened to their supporting plate by fastening arrangements indicated at 130. These fastening arrangements permit removal of the rails when desired and also permit limited lateral adjustments of the rails to vary the width of the runway between them to accommodate glass containers of different diameters.

It may be desirable to preheat the containers before presenting them to the filling machine. This may be done before, during or after the container washing operation. Any suitable known heating means may be associated with the apparatus to provide the heat required. Such a heating means, per se, does not form part of the present invention and hence has not been shown in the drawings.

Washing of the containers at a level below that at which they are delivered to the filling machine serves to obviate likelihood of entry of dust or other foreign matter into the containers after they have been washed and before they arrive at the filling machine. Also, this arrangement facilitates collection and removal of excess and waste wash water without wetting adjacent machinery or supplies.

An advantageous feature of the invention is the provision of container holders or receptacles which are open at the sides thereof opposite the conveyor chain by which they are moved in an endless series along a closed path. This feature greatly facilitates loading and unloading of the containers into and from the holders or receptacles and permits the use of automatic mechanisms for these operations and the performance of such operations while the conveyor is in motion.

Apparatus of the invention may be used to transport containers otherwise than as hereinbefore particularly pointed out, as from a loading station on a lower floor to an unloading station on a higher floor or betwen any other suitably located loading and unloading stations. Containers made of materials other than glass obviously may be transported in the same manner as the glass containers.

The invention is not limited to the details of construction and mode of operation of the illustrative embodiment of the invention shown in the drawings and herein particularly described as various changes therein and modifications thereof will be obvious or readily occur to those skilled in the art.

We claim:

1. In apparatus for conveying containers, a plurality of holders, each having a pocket adapted to accommodate a container and open at one side to permit such a container to be moved laterally into and out of the pocket, an endless chain, means for pivotally attaching said holders to the chain at one side of the latter and for articulating the holders together in an endless series, means for movably supporting and guiding said chain for movement along a closed path, means for moving said chain along said closed path, and means for guiding said holders during movements thereof by said chain.

2. In apparatus for conveying containers, a plurality of holders, each formed to define a pocket therein of a generally U-shaped configuration in cross section, an endless chain, means for pivotally attaching said holders to one side of said chain so that the open sides of said pockets face away from said chain, means for articulating said holders together in an endless flexible series movable with said chain, means for supporting and guiding said chain for movement along a closed path, means for moving said chain along said path to effect movement of said series of holders along an adjacent path and means for moving containers laterally into the pockets of said holders in succession at one point along their path of movement.

3. In apparatus for conveying containers, a plurality of holders, each formed to define a pocket therein of a generally U-shaped configuration in cross section, an endless chain, means for pivotally attaching said holders to one side of said chain so that the open sides of said pockets face away from said chain, means for articulating said holders together in an endless flexible series movable with said chain, means for supporting and guiding said chain for movement along a closed path, means for moving said chain along said path to effect movement of said series of holders along an adjacent path, means for moving containers laterally into the pockets of said holders in succession at one point along their path of movement, and means for moving containers laterally out of the pockets of successive holders at another point along the path of movement of said holders.

4. In apparatus for conveying containers, a chain comprising a series of links and transverse pivot pins pivotally connecting adjacent links together, spaced pins projecting from one side of the chain, and a series of holders, each having a pocket adapted to accommodate a container and open at one side to permit such a container to be moved laterally into and out of the pocket, each of said holders being disposed between and supported at both sides thereof by two of the pins projecting from said one side of the chain with the open side of the pocket of the holder turned away from the chain.

5. In apparatus for conveying containers, a chain comprising a series of links and transverse pivot pins pivotally connecting adjacent links together, regularly spaced certain of the pivot pins less than the total number of them being relatively long and having end portions projecting laterally of the links at one side of the chain, and a series of holders, each formed to define a pocket therein adapted to accommodate a container and open at one side to permit such a container to be moved laterally into and out of the pocket, each of said holders being disposed at said one side of the chain between the projecting end portions of two adjacent relatively long pivot pins with the open side of the pocket of the holder turned away from the chain, said holder being provided with supporting elements extending laterally from its opposite sides and engaged with the projecting end portions of said two adjacent relatively long pivot pins to support the holder thereon for movement with the chain, the adjacent laterally extending supporting elements of adjacent holders being engaged with projecting end portions of the same relatively long pivot pins so as to provide an articulated series of the holders movable by the chain along a path extending at one side of the path of the chain.

6. In apparatus for conveying containers, a chain comprising a series of links and transverse pivot pins pivotally connecting adjacent links together, end extensions of regularly spaced certain of said pivot pins projecting laterally of one side of the chain for a substantial distance, container holders having pockets open at one side, each of said holders having a laterally extending flange at one side thereof apertured to fit over one of said end extensions and mounted thereon and a laterally extending flange at its opposite side formed with an open slotted end portion engaged with the adjacent end extension, whereby said holder is supported by said two adjacent end extensions of pivot elements of the chain at one side of the latter with the open side of the pocket of the holder turned away from the chain, said holders being relatively arranged so that the adjacent laterally extending flanges of each two adjacent holders overlap and respectively are mounted upon and engage the same pivot pin end extension.

7. Apparatus as defined by claim 6 wherein each of said holders is provided with downwardly and inwardly extending flanges at opposite sides of the holder pocket at the bottom thereof for engaging the shoulder of an inverted shouldered open ended container to support such a container in the pocket without obstructing its open end.

8. Apparatus as defined by claim 6 wherein each of said holders is provided with upper and lower transversely extending guide channels at the top and bottom, respectively, of a portion thereof that is located between the container pocket in said holder and said chain.

ROBERT F. KOPPISCH.
THOMAS WAUGH.

REFERENCES CITED

The following references are of record in the file of this patent:

UNITED STATES PATENTS

| Number | Name | Date |
|---|---|---|
| 1,276,898 | Gallup et al. | Aug. 27, 1918 |
| 1,574,307 | Risser | Feb. 23, 1926 |
| 1,853,917 | Meyer et al. | Apr. 12, 1932 |
| 1,879,770 | Simonsson | Sept. 27, 1932 |
| 1,904,685 | Gruetter | Apr. 18, 1933 |
| 1,934,250 | Wynne et al. | Nov. 7, 1933 |
| 2,210,530 | Dostal | Aug. 6, 1940 |
| 2,219,055 | Pereslegin | Oct. 22, 1940 |
| 2,292,220 | Gardner | Aug. 4, 1942 |
| 2,344,975 | DeBack | Mar. 28, 1944 |

FOREIGN PATENTS

| Number | Country | Date |
|---|---|---|
| 353,992 | Great Britain | Aug. 6, 1931 |
| 514,117 | Great Britain | Oct. 31, 1939 |